Nov. 18, 1969  J. P. H. LANES  3,478,669
APPARATUS FOR MAKING WINE
Filed Sept. 16, 1966  2 Sheets-Sheet 2

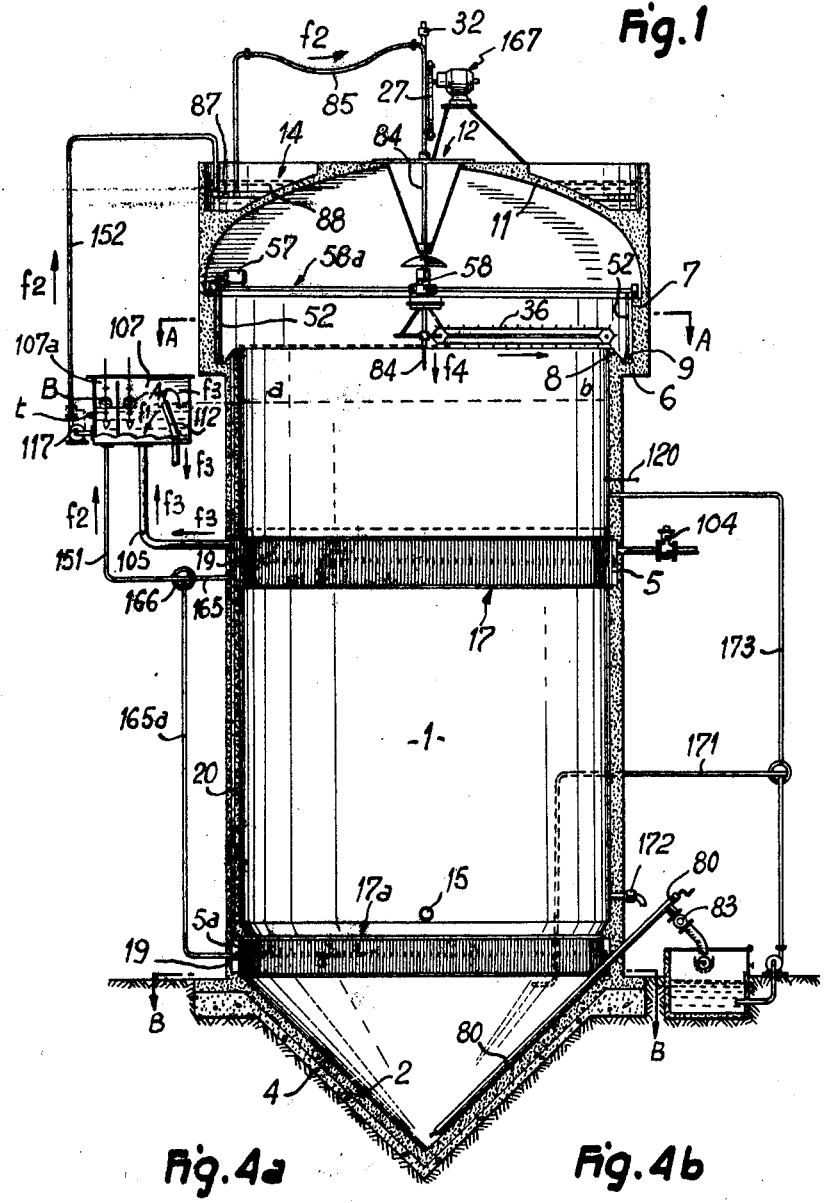

INVENTOR
JACQUES P.H. LANES

By
Cushman, Darby & Cushman
ATTORNEYS

United States Patent Office 3,478,669
Patented Nov. 18, 1969

3,478,669
APPARATUS FOR MAKING WINE
Jacques P. H. Lanes, 12 Rue du Palais,
Carcassonne, Aude, France
Filed Sept. 16, 1966, Ser. No. 580,007
Claims priority, application France, Sept. 17, 1965,
31,873; Feb. 9, 1966, 49,020
Int. Cl. C12b 1/10
U.S. Cl. 99—276                                   8 Claims

ABSTRACT OF THE DISCLOSURE

Apparatus for the fermentation of crushed grapes comprising a vertically positioned fermentation tank, having a top portion, closed body and a cylindrical portion intermediate said top and bottom. A conduit for introducing crushed grapes into the tank is provided at the lower portion thereof. The apparatus also includes means for washing the cap formed at the top portion of the tank and a conduit in the cylindrical portion of the tank for withdrawing wine therefrom. This conduit also includes a recycle conduit which communicates with the upper portion of the tank. The apparatus also includes injector means adapted to be vertically reciprocated within the upper portion of the tank.

---

The present invention relates to an apparatus for making wine of regular quality, under excellent economic conditions. The invention is particularly related to apparatus for the continuous fermentation in a single tank of the vintage of a geographic region during the harvest.

It is known that, to effect substantial savings in the economy and labor relating to fermentation processes, wine making techniques have already been proposed whereby wine from the vintage of a given region can be prepared in a single tank as the harvest proceeds. However, these processes have generally been unsatisfactory because of incomplete fermentation and because of the nonuniform quality of the grapes utilized which often depends upon meteorological and geographic factors.

Generally, in making wine, grapes are pressed to provide a suspension of heavy parts (chiefly seeds) and light parts (stems, pulp, skins) in a fresh must. Thereafter, the fresh must be introduced into a fermentation tank so that conversion of the sugar contained in the must to alcohol can occur naturally, under the effect of the yeasts that bloom in maturity on the skin portion of the fresh must.

It has been found that approximately 125 kilos of grapes, containing, e.g., 15.7 kilos sugar, furnish one hectoliter wine at ten degrees Gay Lussac which corresponds to an alcohol content of 8 kilos. During such a process, it has been observed 3.9 m.$^3$ carbon dioxide are produced with a release of 2880 calories which provides a downward separation of the heavy products and upward separation of the light products, the light products forming a cap in the top of the fermentation vessel.

This cap contains products that are necessary for good wine quality, and it has been found that their recovery can be effected if the cap is subjected to an alcohol extraction process.

Consequently, the cap has heretofore been meticulously washed to remove their advantageous constituents with the fermenting wine produced in the tank. But the known processes of washing by lateral injection of fermenting wine toward the core of the cap have turned out to be ineffective. Extractive washing of part of the cap with reinjection after stirring with the fermenting must upset the regular cycle required in fermenting the must. Consequently, the production of the good quality wine in the tank is generally significantly impaired.

Moreover, it has been observed that the heat generated in the fermentation process raises the temperature of the must and the cap, which, in turn, advantageously accelerates the yeast activity. However, it is advisable not to exceed a temperature limit that appears to be a function of the quality of the grapes, because beyond this limit and in any case at about 40° C. the yeasts become inactive and fermentation ceases.

The cooling processes thus far proposed to increase the daily production of the tanks while insuring the most favorable temperatures for yeast activity have proved to be ineffective because trickling or spraying of the vats with cool water, or cooling of the wine by circulation in a heat exchanger and reinjection into the tank have practically no effect in the mass of the cap which not only contains components that are especially resistant to heat exchange but is also the hottest part of the tank.

Further, in known wine making processes and apparatus difficulties are encountered in removing developed wine and washing the wine due to the strainers used in conventional apparatus. The strainers often are obstructed by the light materials suspended in the tank.

Furthermore, various component parts are often mounted inside conventional fermenting tanks and their presence constitutes serious obstacles to the upward movement of the cap. A blocking of the cap often involves not only stopping the operation of the fermenter but also a deterioration of the must charge because of the combined stresses of hydrostatic thrust of the cap and the pressures due to irregular escape of the carbon dioxide. Finally, disruption of the operation of known wine making apparatus is often caused by irregularities of the amounts of cap produced by a given source of grapes which can depend on the quality of the vines, the geographic region from which they originate, as well as the year.

It has thus been found that conventional apparatus for making wine does not permit simultaneous washing and extraction of the cap and wine in amounts appropriate to the delivery of must. Further, these imperfections lead to large proportions of lees being deposited in the storage tanks. Further, conventional fermentation tanks make it difficult during the harvest to provide a separation of the wines as required by the differences in quality of the batches of grapes from which these wines are made.

It is therefore a principal object of the present invention to overcome the disadvantages of known fermenting apparatus in making wine.

It is a further object to provide a fermenting apparatus which insures the preparation of a wine, in a single tank, as the harvest of a vintage in a particular geographic region progresses.

The invention concerns a wine making aparatus which is particularly efficient for making wine and which is remarkable in that it permits a washing and simultaneous extractions of wine and cap according to desired proportions, especially according to the proportions in which they are present in a vintage.

Other characteristics and advantages of the invention are evident from the description that follows with reference to the attached drawings which are only presented as nonlimitative examples.

FIGURE 1 is an elevational view, in section, through the apparatus;

FIGURES 4a and 4b are fragmentary top plan views of the basket and cleaning comb mechanism associated with the fermentation vessel of this invention.

Figures 2A, 2B:
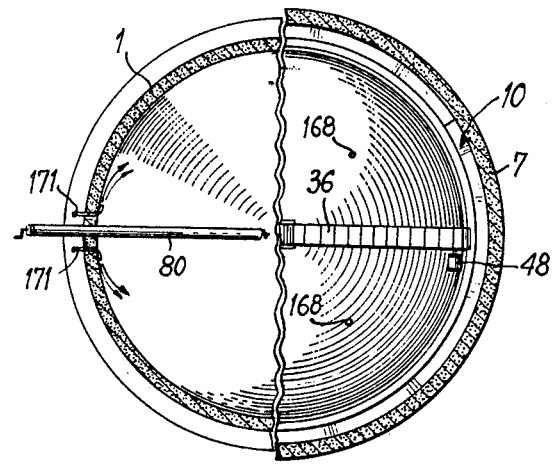
FIGURE 2a is a fragmentary cross-sectional view along the line A—A of FIGURE 1.
FIGURE 2b is a fragmentary cross-sectional view along the line B—B of FIGURE 1.

Referring to the drawings, the novel apparatus according to the embodiment shown in FIGURE 1 comprises a tank 1, preferably of reinforced concrete, having a conical bottom 2 directly supported on a foundation 4. The conical bottom mergers into a cylindrical portion of the tank provided with inlet means 15 opening into the lower third of the tank. The cylindrical portion of the tank in turn is provided with a dome-like top portion 11.

Intermediate the cylindrical portion of the tank there is provided an annular chamber 5, rectangular in section, in communication with the interior of the tank by means of a basket mechanism 17 comprising a plurality of vertically disposed spacedly removed bars 162a fixedly attached to circumferentially extending vertically spaced retainer bars 163. Bars 162a, as best seen in FIGURE 4a, comprise substantially dish-shaped members, the sides of which are directed inwardly with the sides of adjacent bars being spaced removed from each other to provide passageway 164 from the interior of the tank to the annular chamber 5. Intermediate proximate sides of adjacent bars 162a and within each passageway 164 there is provided for vertical reciprocal movement the teeth of cleaning comb mechanism 19 which extends circumferentially around the tank 1. The vertical reciprocal movement of the comb mechanism is limited by the upper and lower retainer bars 163. The comb mechanism 19 is operatively connected to vertically extending rod 20 housed within a vertically extending bore in the wall of the tank 1 and operatively connected at one end to reciprocating means such as cam means 27 and motor 167.

A similar annular chamber 5a is provided between the lower part of the cylindrical portion of the tank and the conical bottom 2 to provide communication with the interior of the tank therewith by means of a basket mechanism 17a essentially of the same construction as basket mechanism 17, described above. A comb mechanism substantially the same as comb mechanism 19, above, is also employed with basket mechanism 17a and is also operatively connected to rod 20 for vertical reciprocation of the teeth thereof between the passageways provided by the space between proximate sides of adjacent dish-shaped vertically extending bars which comprise basket mechanism 17a.

Annular chamber 5 communicates with the bottom of reservoir 107 via conduit 105 and with the bottom of reservoir 107a via conduit 165, three-way valve 166 and conduit 151. Annular chamber 5a communicates with the bottom of reservoir 107a via conduit 165a, three-way valve 166 and conduit 161. Reservoirs 107 and 107a are separated by a common longitudinally extending wall and are in communication with each other via annular chamber 5.

Housed within reservoir 107 is articulated decanting elbow 112 in fluid-tight communication with conduit means leading from the bottom of the reservoir to a wine storage tank or vessel (not shown). Reservoir 107 is also provided with float valve means A to control the liquid level within the reservoir. Housed within reservoir 107a is float valve means B to control the liquid level therein. Additionally, reservoir 107a is in communication with the inlet side of pump means 117, the discharge side of which communicates with a conduit 152 leading to an assembly of tubes 87 immersed in a circumferentially extending trough 14 on the outer surface of dome-like top 11 of the tank 1. Also in communication with the tube assembly 87 is flexible conduit means 85 in communication with one end of injector means 84 extending downwardly into the vessel 1 through the central opening 12 of the dome top 11 which is supported by annular walls 6 and 7 having a diameter greater than the wall of the cylindrical portion of the tank. The lip 8 of the wall of the cylindrical portion of the tank extends above the annular wall 6 to form with annular wall 7 circular channel 9.

Injector means 84 is arranged to reciprocate vertically in hollow shaft 58 to which is connected a radially extending rotary sweep device 58a. A cam 27 keyed on the shaft of a reduction motor 167 controls the vertical movement of the injector means 84 within the vessel, said injector means being provided with vertical aligning guide means 32. The shaped discharge end of injector means 84 is provided with radially disposed apertures to produce a jet-like spray discharge therefrom.

Rotary sweep device 58a is driven by motor 57 and has depending from the extremities thereof brushes 52 engaging the circular channel 9 which is provided with discharge trap 10 for removal of the waste light portions of the charge to the vessel. A radially extending conveyor 36 provided with scrapers and driven by motor 48 is rotatably mounted beneath the rotary sweep device and above the rim of the tank 1. The conveyor 36 extends outwardly a distance sufficient to skim the waste at the top of the tank into the channel 9.

Within the conical bottom 2 of the tank 1 there is provided pomace removal means 80, preferably, a screw conveyor. Any wine pressed from the pomace can be led to a storage vessel via conduit means controlled by valve 83. Additionally, conduit 172, in communication with the lower part of the cylindrical portion of the tank 1 leads to a storage vessel (not shown) for conveyance thereto of wine located within the tank above conduit 172.

Leading from the storage tank into which the wine pressed from the pomace has previously been led via conduit means controlled by valve 83 is conduit 171 which, in turn, is in communication with the interior of the tank adjacent the conical bottom 2. Also in communication with the same storage tank via a three-way valve is conduit 173 which is in communication with the interior of the tank 1 above the basket mechanism 17 and adjacent thermostat means 120.

In operation, tank 1 is charged with grapes using standard must pumps through conduit 15 leading to the lower third of the tank and the fermentation process is begun. The light parts of the crushed grape charge separate from the fermenting must to form the cap, the upper level of which is in contact with the rim 8. The free surface of the wine a, b is established at a level at which the decanter elbow 112 is adjusted.

Figure 5:
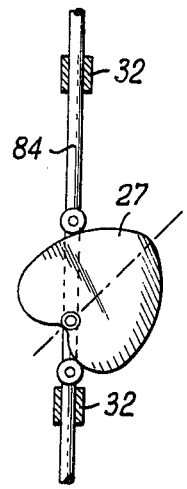
FIGURE 5 is a fragmentary enlarged elevational view of the control mechanism employed with the cap washing means and the cleaning comb mechanism of the invention.

To enrich the fermenting wine with the valuable constituents of the cap, the following procedures are effected. Pump 117 is activated with valve 166 being positioned to deliver wine from chamber 5 via conduit 165 and 151 to reservoir 107a and thence to heat exchange coil 87 located in trough 14. From coil 87 the wine is introduced in a jet spray from the injector 84 via flexible conduit 85, as shown by the directional arrow f2. The tip of injector 84 can be arranged at a predetermined level in the body of the cap, as indicated by arrow f4 by means of the control mechanism shown in FIGURE 5. This control mechanism comprises a cam 27 keyed on the shaft of a reduction motor 162 to cause vertical reciprocation of the injector 84 in the injector guides 32.

It is also possible to cool or heat the cap and thus insure the desired rate of fermentation by controlling the temperature of the washing wine as a function of the heat exchange medium surrounding the heat exchange coil 87 in the trough 88 and of the cap temperature. Additionally, if desired, valve or by-pass devices can be utilized, as well as means associated with pump 117 to control the flow and pressure of the cap washing medium.

Under pressure of radial jets of washing wine, which pressure can be appropriate for the flow resistance of the emergent part of the cap, it is possible to methodically wash the body of the cap at a specific temperature. This cap washing can also be effected continuously by continuous operation of cam 27.

Also, in case of inadequate reach of the jets from injector 84 for rapid washing of the whole cap, taking into account the delivery cycle of must to the tank, a plurality of injectors 168 can be utilized, as best seen in FIGURE 2. These injectors can be retracted upwards in the course of operation of rotary sweep device 58a, and synchronized therewith.

Because of the axial position of the injector and/or the means for upward retraction of the injectors, extractor 36 can be set into operation and driven by rotary sweep device 58a to sweep the entire cap surface and remove during the washing the parts of the cap that are exhausted by the said washing.

It is to be noted that these operations insure a very efficient filtration because the washing downward at various levels makes it possible to reduce to 2% the proportion of less in the storage tanks, whereas the most favorable percentage afforded by known apparatus is about 6 to 8%.

Moreover, the washed wine is below free surface a–b and the zone of separation of the washed wine and the freshly fermented must is lowered a little at a time, until it reaches the level of pipe 105 and then, if there is no charging, to the level of pipe 165.

Accordingly, it is possible to effect a recycling of the washing wine as a function of the quality of the treated vintage. Thus, the washing cycle can be stopped when a charge at 15 provides a wine which it is desired to remove via conduit 105 and decanting elbow 112 to the storage tanks (not shown).

The arrangement of two adequately spaced levels of pipes 105 and 165 facilitates washing of the cap and the cooling thereof by the fermenting wine, as well as supplying the storage tanks with washed wine. In addition, the washing process makes possible the detection of any clogging of basket mechanism 17.

The operation of pump 117 effects the lowering of level c–d of reservoir 107a with reference to level a–b of the tank 1, until the charge of tank 1 on the reservoir corresponds to resistance due principally to the clogging of baskets 17. When chamber 5 is inadequately supplied because of clogging, level c–d is lowered until a float B in said reservoir 107a acts on its lower stop t which is provided to control by a signal (an electric eye, for example) the halting of pump 117 and the automatic starting of the cleaning combs 19.

Moreover, to avoid a sudden and excessive rise of level a–b of the tank, reservoir 107 is equipped with a float A which, by means of a stop, is able to trigger the opening of an electric valve 104 to accelerate discharge of the wine toward the storage tanks.

It can be seen that reservoirs 107 and 107a comprise an arrangement of vessels that communicate with each other via chamber 5.

Figure 3:
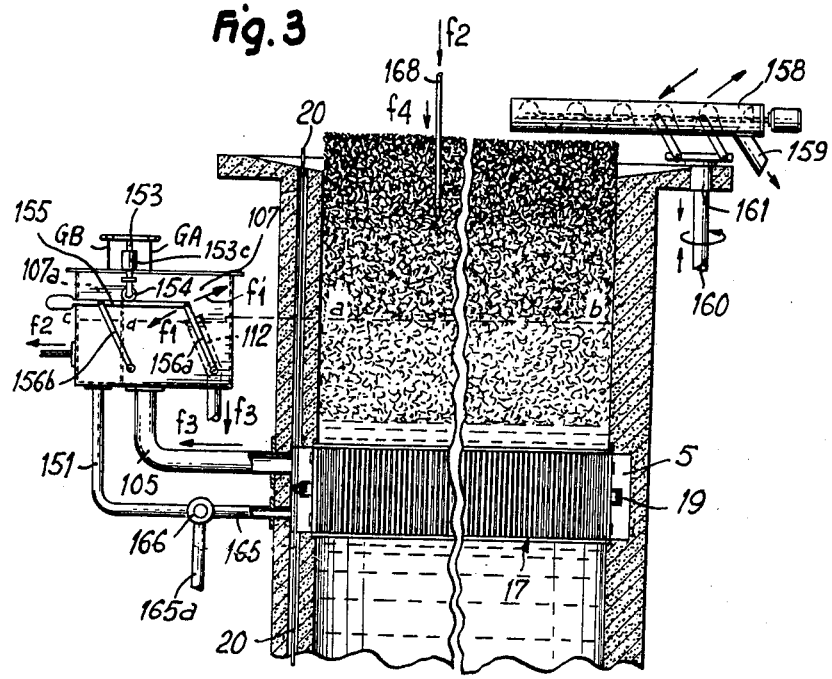
FIGURE 3 is a fragmentary elevational view, in section, through apparatus of another embodiment of the instant invention.

In order to avoid adjustment of the position of floats A–B for every level a–b, the movements of elbow 112 and balances GA–GB are synchronized by means of a double-armed support 153, which supports the balances as best seen in FIGURES 1 and 3.

The upright of this support is engaged in a vertical slide 153c so that its foot, furnished with a roller 154, can be applied against the horizontal bar 155 whose handles 156a and 156b are of a length equal to that of elbow 112 associated with bar 156a whose direction of movement is represented by arrows f1 and f'1, as seen in FIGURE 3.

It can thus be seen that the apparatus of this invention permits removal from the tank 1, simultaneously as required, even in the course of a washing or in the course of must charging, of quantities of cap and wine, specifically quantities according to the proportions presented by the grapes being treated.

It is to be noted that in tank 1 there is no element to impair formation and upward movement of the cap. It is also to be observed that the drawing off of washing wine and developed wine is effected in chamber 5, below the cap.

Also, because of its peripheral arrangement, the collecting surface of chamber 5 is obviously as large as the dimensions of the tank permit, taking into account the separation to be maintained between pipes 105 and 165 to effect desired separation of the wines. As a consequence, the rate of removal will be low and thus clogging of the baskets will be avoided.

Baskets 17 and 17a, as best seen in FIGURES 4a and 4b, are advantageously constructed of bars simply fixed on the flat bars that can be adapted to the curvature of the frame of tank 5. The said bars are conveniently constructed to provide profiled sections 162a, 162b, whose ends form open V-shaped apertures 164 which have proved to be very efficient for pulp retention outside chamber 5 and for pulp disengagement by the upward movement of the stems toward the cap.

Finally, this apparatus readily allows successive fermentations of batches of grapes of different qualities and the separation of the wines produced from these different qualities of grapes. In such operations, after the final charge at 15 of a batch of must to fill the tank, the fermentation in the tank is accelerated as much as the washing of the cap will allow. In accordance with such procedures, valve 166 is positioned to communicate chamber 5a with conduit 165a and reservoir 107a. Pump 117 is activated, the cold must delivered to coil 87 in trough 88 is heated by maintaining a hot water bath in trough 88, so that the most favorable temperature for activity of the yeast is rapidly reached. As soon as the fermentation generates sufficient heat, the heating of the water in trough 88 is halted. The water will then be cooled, as soon as the cap reaches the desired temperature. These bath heating and cooling operations can be controlled automatically by thermostat 120.

When the fermentation in the tank has advanced sufficiently, the cap washing procedure is stopped and wine taken from a storage tank is injected into tank 1 via passage 171, thereby lifting the cap so that it can be completely removed by conveyor 36. Then screw 80 will be manually operated to extract the pomace collected on the tank bottom.

Finally, racking to the storage tanks can be effected by opening conduit 172 to deliver thereto all the wine above the said conduit. The wine below conduit 172 can be reserved to initiate the fermentation of the freshly charged grapes. Of course, the wine that contains the cap and the pomace can be extracted in a press, and the "press wine" can be charged into the tank via conduit 15 or conduit 173.

In accordance with another embodiment of the instant invention especially designed for small-scale apparatus, as best seen in FIGURE 3, the charge to the tank 1 can be effected manually, and a cap extractor can comprise simply a small trough equipped with a conveyor screw 158. The trough can be articulated by bars to a support rod 160 provided to slide and turn in a sleeve 151 which, in turn, can be enclosed in the curb at the top of the vat.

Finally, the washing circuit of this wine making apparatus may comprise a heat exchanger and, in this connection, coil 87 could be replaced by an exchanger associated with a refrigerating machine and a boiler.

Obviously, the present invention is not limited to the above terms but comprises, on the contrary, all modifications within the ability of those skilled in the art.

I claim:

1. Apparatus for the fermentation of crushed grapes comprising a vertically positioned fermentation tank, having a top portion, closed body and a cylindrical portion intermediate said top and bottom, a conduit for introducing crushed grapes into the lower portion of said tank, means for washing the cap formed at the top portion of said tank thereby extracting wine soluble constituents thereof to enhance the quality of said wine, first conduit means in the cylindrical portion of said tank for withdrawing wine therefrom, said conduit means including a recycle conduit in communication with the upper portion of said tank and injector means adaptable to be vertically reciprocated within the upper portion of said tank at a predetermined level in said cap formed therein.

2. The apparatus of claim 1 wherein said injector means comprises at least a tube having a plurality of radially extending holes adjacent the discharge end thereof.

3. The apparatus of claim 1 including a first annular chamber in communication with the interior of said tank in the cylindrical portion thereof, said conduit leading from said annular chamber and being in communication with the upper portion of said tank.

4. The apparatus of claim 3 including open basket means in the cylindrical portion of said tank for communication from the interior of said tank to said annular chamber, said open basket means comprising a plurality of dish-shaped vertically extending members, the edges of said dish-shaped members being directed inwardly of said tank, the edges of each dish-shaped member being laterally spaced from the next adjacent dish-shaped member and cleaning means disposed within the spaces between edges of adjacent dish-shaped members and adaptable to be vertically reciprocated therein.

5. The apparatus of claim 3 including a second annular chamber in communication with the interior of said tank in the cylindrical portion thereof, said second annular chamber being spacedly removed from said first annular chamber and positioned adjacent the lower part of said cylindrical portion, conduit means leading from said second annular chamber and in communication with the upper portion of said tank and second open basket means in said lower part of said cylindrical portion of said tank for communication from the interior of said tank to said second annular chamber, said second open basket means comprising a plurality of dish-shaped vertically extending members, the edges of said dish-shaped members being directed inwardly of said tank, the edges of each dish-shaped member being laterally spaced from the next adjacent dish-shaped member and cleaning means disposed within the spaces between adjacent dish-shaped members and adaptable to be vertically reciprocated therein.

6. The apparatus of claim 5 including reservoir means in communication with said conduit means from said first and second annular chamber and with said recycle conduit means, said reservoir provided with means for regulating the liquid level in said tank and pump means for withdrawing wine from said annular chambers and for recycling wine to the top portion of said tank.

7. The apparatus of claim 3 including third conduit means leading from said first annular chamber and in communication with the interior of said tank at a level below said first conduit means.

8. The apparatus of claim 7 including means for regulating the temperature of the wine in said recycle conduit.

References Cited

UNITED STATES PATENTS

| | | | |
|---|---|---|---|
| 2,034,468 | 3/1936 | Heuser | 99—276 X |
| 2,536,994 | 1/1951 | Cremaschi | 99—276 |
| 2,758,030 | 8/1956 | Metz | 99—278 |

ROBERT W. JENKINS, Primary Examiner